United States Patent
Hayakawa

(10) Patent No.: US 9,473,649 B2
(45) Date of Patent: Oct. 18, 2016

(54) IMAGE READING APPARATUS WITH PUSH SCANNING, METHOD OF CONTROLLING THE SAME, AND STORAGE MEDIUM

(71) Applicant: CANON KABUSHIKI KAISHA, Tokyo (JP)

(72) Inventor: Mizuki Hayakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/744,902

(22) Filed: Jun. 19, 2015

(65) Prior Publication Data
US 2016/0006890 A1    Jan. 7, 2016

(30) Foreign Application Priority Data
Jul. 1, 2014 (JP) .................................. 2014-136213

(51) Int. Cl.
H04N 1/00 (2006.01)
(52) U.S. Cl.
CPC ........ *H04N 1/00228* (2013.01); *H04N 1/0097* (2013.01); *H04N 1/00217* (2013.01); *H04N 1/00384* (2013.01); *H04N 1/00482* (2013.01); *H04N 2201/0094* (2013.01)
(58) Field of Classification Search
CPC ............. H04N 1/00228; H04N 1/00217; H04N 1/00384; H04N 1/00482; H04N 1/0097; H04N 2201/0094

USPC ................ 358/1.15, 405, 407; 709/228, 231
See application file for complete search history.

(56) References Cited

U.S. PATENT DOCUMENTS

| | | | |
|---|---|---|---|
| 7,730,191 B2 | 6/2010 | Otsuka et al. | ................. 709/227 |
| 8,019,918 B2 | 9/2011 | Otsuka et al. | .................. 710/36 |
| 2007/0208863 A1 | 9/2007 | Otsuka et al. | ................. 709/227 |
| 2013/0235421 A1* | 9/2013 | Ono | ..................... H04N 1/0023 358/1.15 |
| 2015/0156359 A1 | 6/2015 | Hayakawa | ......... H04N 1/00811 |

FOREIGN PATENT DOCUMENTS

JP    2007-219956    8/2007
JP    2008-034923    2/2008

* cited by examiner

*Primary Examiner* — Jamares Q Washington
(74) *Attorney, Agent, or Firm* — Fitzpatrick, Cella, Harper and Scinto

(57) ABSTRACT

In event type push scan, information identifiable by communication between a scanner and a PC is limited by a communication protocol, and there is no method of notifying settings for scan from the scanner to the PC. For this reason, settings for push scan made by a user cannot be reflected on execution of scan. According to an embodiment, the scanner is controlled in the following way. That is, a condition to execute image reading is set, and the setting is stored. When image reading is instructed, an information processing apparatus is notified of an image reading event before the start of image reading. After that, control is performed to start image reading based on the stored condition in accordance with the instruction from the information processing apparatus according to the event notification.

20 Claims, 10 Drawing Sheets

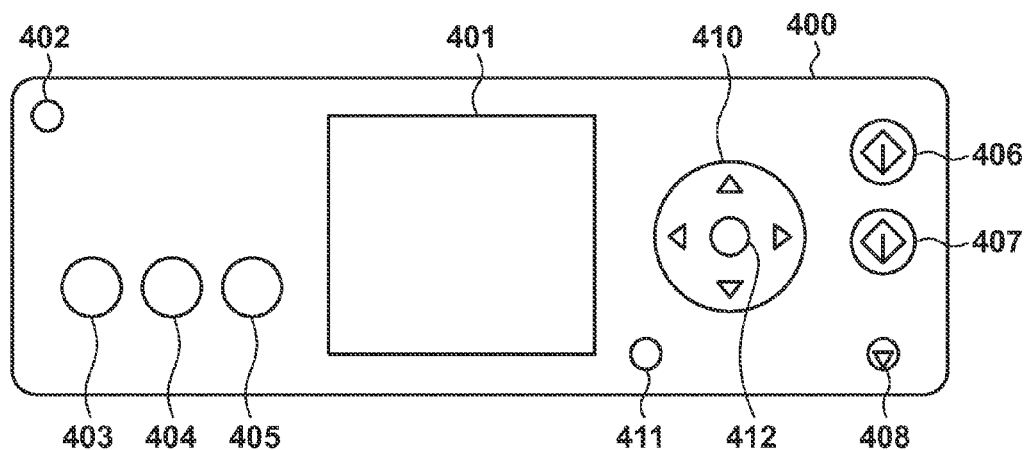

FIG. 6

| ORIGINAL TYPE | READING SETTINGS |
|---|---|
| DOCUMENT | READING SIZE<br>SAVING FORMAT<br>RESOLUTION<br>ADF ORIGINAL ORIENTATION<br>ADF DOUBLE-SIDED READING<br>SHOW-THROUGH REDUCTION<br>MOIRÉ REDUCTION<br>EDGE ENHANCEMENT |
| PHOTO | READING SIZE<br>SAVING FORMAT<br>RESOLUTION<br>EDGE ENHANCEMENT |
| FILM | SAVING FORMAT<br>RESOLUTION<br>EDGE ENHANCEMENT |

IMAGE READING APPARATUS WITH PUSH SCANNING, METHOD OF CONTROLLING THE SAME, AND STORAGE MEDIUM

BACKGROUND OF THE INVENTION

1. Field of the Invention

The present invention relates to an image reading apparatus, a method of controlling the same, and a storage medium, and particularly to an image reading apparatus for optically reading an image, a method of controlling the same, and a storage medium.

2. Description of the Related Art

Conventionally, some of image reading apparatuses (for example, scanners) connected on a network have a scan function of transmitting data (to be referred to as scan data, image data, or original data hereinafter) generated by reading an image original to an information processing apparatus such as a PC. The scan function includes a pull scan function and a push scan function.

The pull scan function is a function of activating the scan function of an image reading apparatus by an operation on the side of an information processing apparatus and transmitting scan data from the image reading apparatus to the information processing apparatus. On the other hand, the push scan function is a function of determining an information terminal apparatus to transmit scan data by an operation on the side of an image reading apparatus and transmitting the scan data to the information terminal apparatus. In an MFP (MultiFunction Printer) that integrates an image reading apparatus and an image formation apparatus (for example, printer), an event for notifying a desire to start a scan operation is notified from the MFP to the information processing apparatus, and pull scan is performed from the information processing apparatus based on the information.

In a network system that includes a plurality of information processing apparatuses and a plurality of image reading apparatuses and is not occupied for communication between a specific information processing apparatus and a specific image reading apparatus, two methods are usable to recognize an event notification from a specific image formation apparatus to a specific information processing apparatus. One is a method (polling type push scan) of performing polling from the information processing apparatus to the image reading apparatus (Japanese Patent Laid-Open No. 2007-219956). In this method, transmission destination information or setting information in scan can be stored in various kinds of request packet frames to be transmitted from a client to a server. The other is a method (event type push scan) of causing the image reading apparatus to notify event occurrence to all or specific information processing apparatuses (Japanese Patent Laid-Open No. 2008-034923). Hence, the event type push scan need not generate an unnecessary packet on the network as compared to the polling type push scan.

In the event type push scan, information identifiable by communication between the image reading apparatus and the information processing apparatus is limited by a protocol, unlike the polling type push scan. For example, push scan (WSD push scan) in a WSD scan service employed by Windows® Vista/7 does not have a method of notifying settings such as a reading size, saving format, and resolution necessary for scan from a scanner to a PC. For this reason, settings for push scan made by a user on the image reading unit of an MFP cannot be reflected upon executing the scan function.

SUMMARY OF THE INVENTION

Accordingly, the present invention is conceived as a response to the above-described disadvantages of the conventional art.

For example, an image reading apparatus, a method of controlling the same, and a storage medium according to this invention are capable of executing image reading that reflects reading conditions set by a user on the image reading apparatus in, for example, event type push scan.

According to one aspect of the present invention, there is provided an image reading apparatus for optically reading an image, comprising: an operation unit configured to cause a user to perform an operation; a storage unit configured to store a condition, to execute reading of the image, which is set in accordance with the operation on the operation unit; a notification unit configured to notify an information processing apparatus, which is a transfer destination of image data obtained by performing the reading, of an event of image reading in accordance with an instruction of the image reading on the operation unit; and a control unit configured to control, in accordance with an instruction from the information processing apparatus according to the event notification by the notification unit, to start the image reading based on the condition stored in the storage unit in advance before the instruction.

The invention is particularly advantageous since in, for example, event type push scan, image reading is performed in accordance with an instruction from an information processing apparatus based on image reading conditions set by the user on the setting unit of the image reading apparatus without notifying the information processing apparatus of the conditions. This makes it possible to implement image reading reflecting a user's intention by a simple operation.

Further features of the present invention will become apparent from the following description of exemplary embodiments (with reference to the attached drawings).

BRIEF DESCRIPTION OF THE DRAWINGS

FIG. 4 is a view showing the layout arrangement of an operation panel including the display unit and the operation unit of the MFP.

FIG. 5 is a view showing an example of saving destinations selectable when performing push scan and original types according to them.

FIG. 6 is a view showing an example of reading settings according to original types when performing push scan.

DESCRIPTION OF THE EMBODIMENTS

Figure 1:
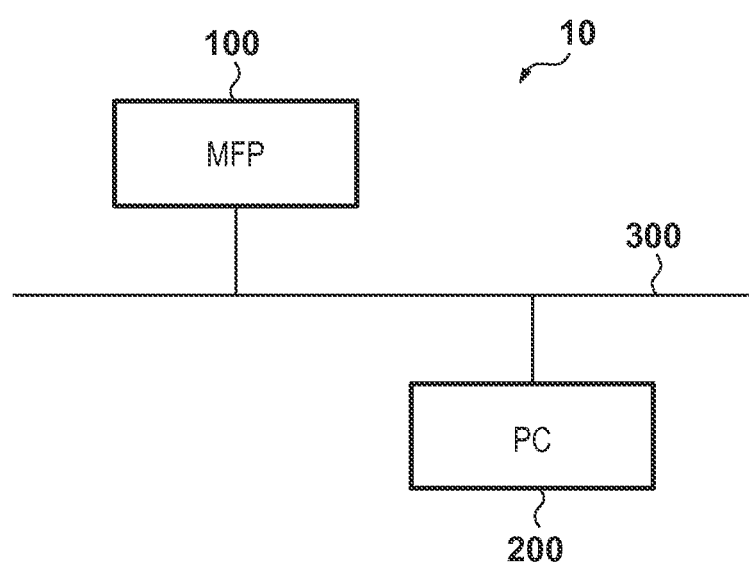
FIG. 1 is a block diagram showing the schematic arrangement of an information processing system according to an embodiment of the present invention, which includes an MFP and a PC.

Exemplary embodiments of the present invention will now be described in detail in accordance with the accompanying drawings. Note that the same reference numerals denote already explained parts, and a repetitive description thereof will be omitted.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Push scan performed using a WSD protocol in an information processing system in which an MFP (MultiFunction Printer) having a print function and a scanner function is connected to an information processing apparatus (PC) via a network will be described.

FIG. 1 is a block diagram showing the schematic arrangement of an information processing system according to an embodiment of the present invention. As shown in FIG. 1, an MFP 100 and a PC 200 included in an information processing system 10 are connected to a local area network (LAN) 300. The MFP 100 and the PC 200 serving as an information processing apparatus can communicate with each other via a WSD protocol.

The LAN 300 is assumed to be a wired LAN in the following explanation. Instead, a wireless LAN or a network including both a wired LAN and a wireless LAN may be used. The apparatus connected to the PC 200 is not limited to the MFP 100 and may be a scanner apparatus (image reading apparatus) having a single function. Note that although FIG. 1 illustrates only one PC and one MFP, a plurality of PCs and a plurality of MFPs can be connected to the same LAN.

Figure 2:
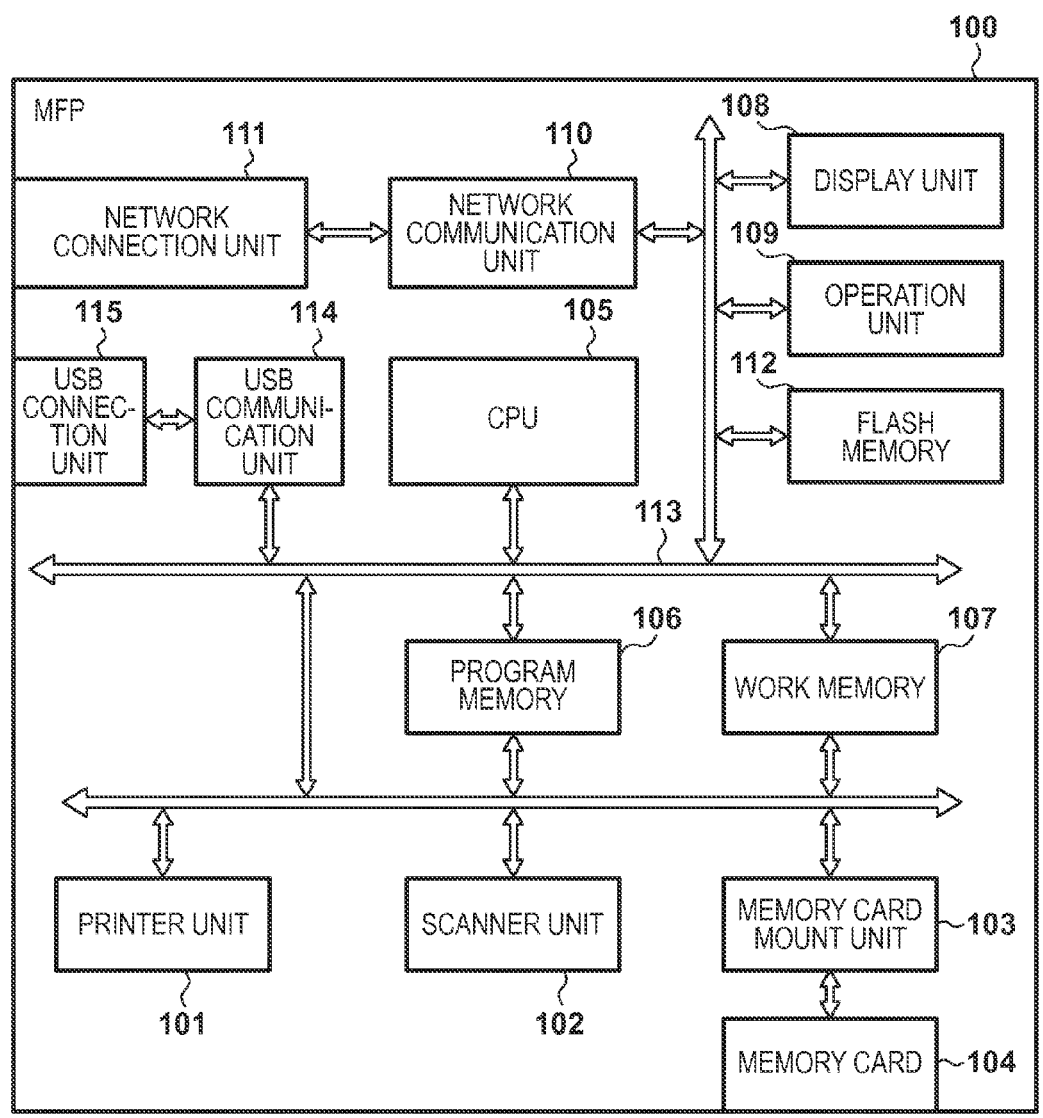
FIG. 2 is a block diagram showing the schematic arrangement of the MFP.

FIG. 2 is a block diagram showing the schematic arrangement of the MFP 100.

The MFP 100 has a printer (image formation) function, a scanner function, and a storage function, and can provide each functional service via the network. The printer function of the MFP 100 is implemented by a printer unit 101, the scanner function is implemented by a scanner unit 102, and the storage function is implemented by a memory card mount unit 103 and a memory card 104.

The printer unit 101 prints on a print medium such as a printing paper sheet by a printer engine employing an inkjet method or an electrophotographic method based on print data received from the outside, image data stored in the memory card 104, or the like. The scanner unit 102 optically reads an original set on an original table, converts the data into electronic data, further converts the data into a designated file format, and transmits the data to an external apparatus via the network. In a copy service, image data generated by reading an original placed on the original table by the scanner unit 102 is transferred to the printer unit 101, and the printer unit 101 prints the image on a printing paper sheet. A file stored in the memory card 104 can be read out and edited by an external apparatus connected via the network and then stored in the memory card from the external apparatus.

According to the arrangement of the information processing system shown in FIG. 1, the external apparatus is an information processing apparatus (PC).

The MFP 100 also includes a CPU 105 configured to control the units of the MFP, and a program memory 106 such as a ROM storing program codes and the like to be read by the CPU 105. The MFP 100 further includes a work memory 107 such as a RAM configured to temporarily store or buffer image data or the like upon executing each service, a display unit 108 such as an LCD, and an operation unit 109 formed from switches (to be described later).

The MFP 100 also includes a network communication unit 110 configured to connect the MFP 100 to the network and perform various kinds of communications, and a network connection unit 111 configured to connect the network communication unit 110 to the network. The network communication unit 110 supports at least one of a wired LAN and a wireless LAN. The network connection unit 111 supporting the wired LAN is a connector configured to connect the cable of the wired LAN to the MFP 100. The network connection unit 111 supporting the wireless LAN is an antenna. To store transmission source information of a packet received by the network communication unit 110, the MFP 100 includes a memory 112 such as a non-volatile flash memory.

The above-described units of the MFP are connected by a signal bus 113.

The MFP 100 also includes a USB communication unit 114 configured to communicate with the information processing apparatus (PC) 200 via a USB interface, and is connected to the information processing apparatus (PC) 200 by a USB connection unit 115 such as a USB connector.

Figure 3:
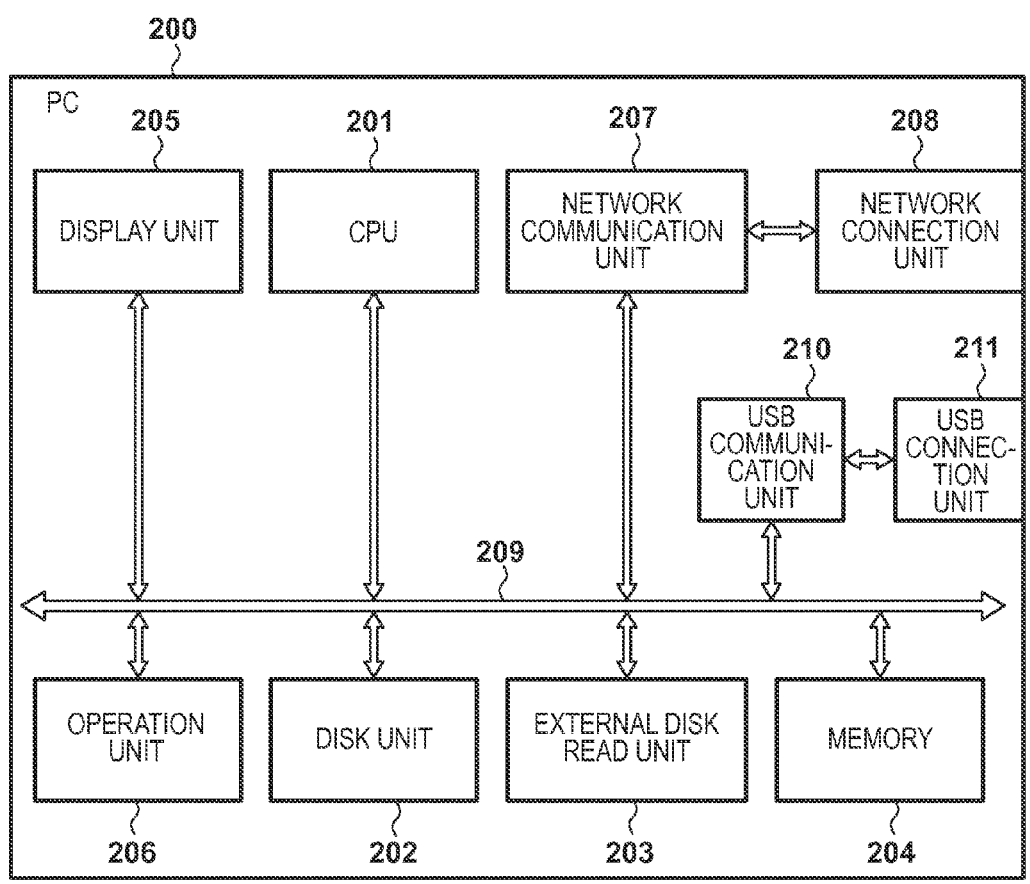
FIG. 3 is a block diagram showing the schematic arrangement of the PC.

FIG. 3 is a block diagram showing the schematic arrangement of the information processing apparatus (PC) 200.

Referring to FIG. 3, the PC 200 includes a CPU 201 configured to control the units, and a disk unit 202 in which application programs, OS (Operating System), and the like to be read out by the CPU 201 are installed, and various kinds of files and the like are stored. The OS supports the WSD protocol of Windows® Vista, Windows7, or the like.

The PC 200 also includes an external disk read unit 203 configured to read out the contents of an external storage medium such as a CD-ROM, and a memory 204 used by the CPU 201 to temporarily store or buffer data as needed. The PC 200 further includes a display unit 205 such as an LCD, an operation unit 206 including a keyboard, a Mouse®, and the like, a network communication unit 207 configured to connect the PC 200 to the network and perform communication, and a network connection unit 208 that connects the network communication unit 207 to the network. The PC 200 also includes a USB communication unit 210 configured to communicate with various kinds of peripheral units via a USB interface, and a USB connection unit 211 such as a USB connector.

As in the MFP 100, the network communication unit 207 and the network connection unit 208 support at least one of a wired LAN and a wireless LAN. As for a specific configuration, they take necessary functions and configurations in accordance with the supported LAN, like the network communication unit 110 and the network connection unit 111 integrated in the MFP 100. The above-described constituent elements are connected to each other by a signal bus 209.

FIG. 4 is a view showing the layout arrangement of an operation panel including the display unit 108 and the operation unit 109 of the MFP 100. As shown in FIG. 4, an operation panel 400 includes an LCD screen 401 corresponding to the display unit 108, and keys 402 to 408 and 410 to 412 operated by the user to form the operation unit 109.

The power key 402 selectively instructs power on/off of the units of the MFP 100. The copy key 403 causes the MFP 100 to start copy. The scan key 404 requests push scan of the MFP 100. Push scan is a service to transmit scan data obtained by reading an original placed on the original table to a designated PC, triggered by an operation on the MFP 100. The location to save scan data, the type of original, and reading settings used for scan can be selected by operating the arrow key 410 and the determination key 412 (to be described later) while viewing the LCD screen 401.

In a case where the memory card 104 is mounted on the MFP 100, the memory card key 405 causes the MFP 100 to start a service to, for example, print (to be referred to as memory card print hereinafter) or display an image file or the like stored in the card. The color start key 406 causes the MFP 100 to start execution of copy, push scan, memory card print, or the like in color, and the monochrome start key 407 causes the MFP 100 to start execution of copy, push scan, memory card print, or the like in monochrome. The stop key 408 causes the MFP 100 to stop the started copy, push scan, memory card print, or the like. The arrow key 410 is used to search for a menu to set or a file in the memory card 104 to print or display. The return key 411 is used to, for example, return a menu screen to an immediately preceding screen. The determination key 412 is used to select or determine an item indicated by a cursor on the LCD screen 401.

FIG. 5 is a view showing an example of saving destinations selectable by the user when performing push scan and original types according to them. For example, after the user presses the scan key 404, a list of saving destinations: "personal computer"; "attach to mail"; "memory card"; and "USB memory" is displayed on the LCD screen 401 to cause the user to select a location to save data. After that, the user selects an original type to be scanned, thereby enabling reading settings corresponding to the original type.

If the user selects "personal computer" or "attach to mail" as the saving destination, he/she needs to select a PC connected via USB or a plurality of PCs connected via a network as the destination to scan. To do this, connection methods, the names of personal computers, or the names of users who have logged in to personal computers are displayed on the LCD screen 401, and the user is caused to make a selection, thereby enabling execution of scan to an appropriate destination.

On the other hand, in a case where the user selects "memory card" as the saving destination, an image is directly saved in the memory card 104 mounted in the memory card mount unit 103 of the MFP 100. Hence, communication with the PC 200 is unnecessary, and the scan operation is completed only by processing in the MFP 100. Although the memory card has been exemplified here, an image can also directly be saved in a USB memory mounted in the USB connection unit 115. Similarly, in a case where the MFP 100 supports direct connection of a writable medium such as a CD-R, CD-RW, DVD, BLD, or HDD, the medium can be displayed in the saving destination list, and an image can be saved in it.

FIG. 6 is a view showing an example of reading settings according to original types when the user performs push scan. The user can do desired reading settings while confirming display on the LCD screen 401.

In "reading size", A4, L size, 2 L size, postcard, KG, business card, letter size, auto crop, and the like are selectable. Auto crop is a function of scanning the entire area of the original table and performing cropping according to the size of an original. In "saving format", file formats such as JPEG, TIFF, and PDF are selectable. The compression ratio or the like of PDF or JPEG may be settable together. In "resolution", resolutions such as 75 dpi, 150 dpi, 300 dpi, 600 dpi, 1200 dpi, 2400 dpi, and 4800 dpi are selectable. In the resolution list, only resolutions assumed to be appropriate for an original type may be displayed.

In "ADF original orientation", long-side stitching or short-side stitching is selectable as the orientation of an original on the ADF. Based on the selection, a scanned image is rotated in an appropriate direction and output. In "ADF double-sided reading", whether to enable the double-sided reading function of the ADF is set. In "show-through reduction", whether to perform image processing for reducing show-through of the reverse side of a double-sided original is set. In "moiré reduction", whether to perform image processing for reducing moiré that occurs when scanning a magazine or the like is set. In "edge enhancement", whether to perform image processing for enhancing the outline of an image is set.

Note that although the original types are "document", "photo", and "film", as shown in FIGS. 5 and 6, other types may exist.

Figure 7:
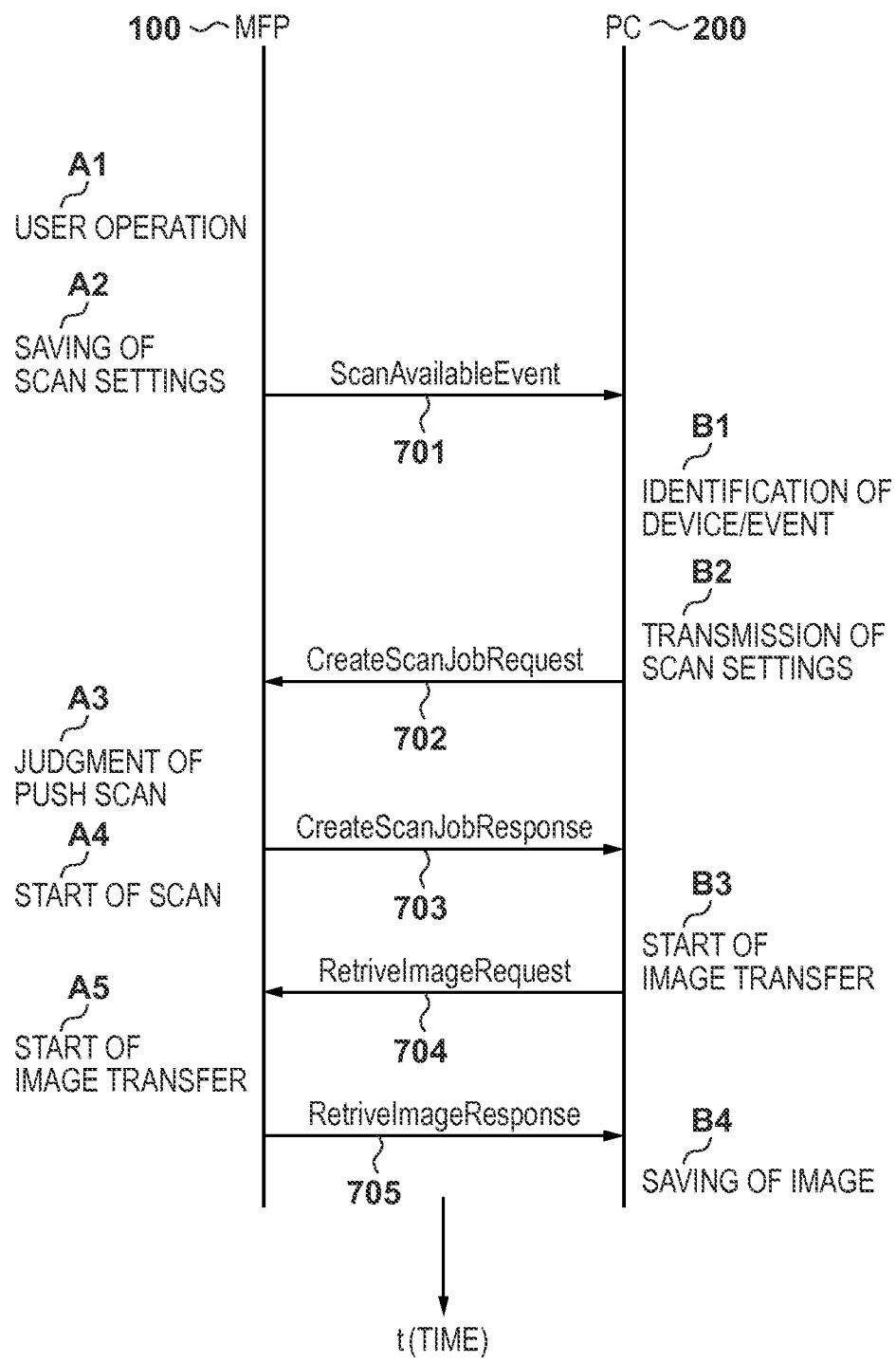
FIG. 7 is a sequence chart when the MFP and PC communicate via a network to perform push scan.

FIG. 7 is a sequence chart when the MFP 100 and PC 200 communicate via the network 300 to perform push scan. In FIG. 7, the sequence progresses in the direction of the arrow of the time base (t). In push scan, image reading is performed by the MFP 100. The transfer destination of image data obtained by the reading is the PC 200.

Figure 8:
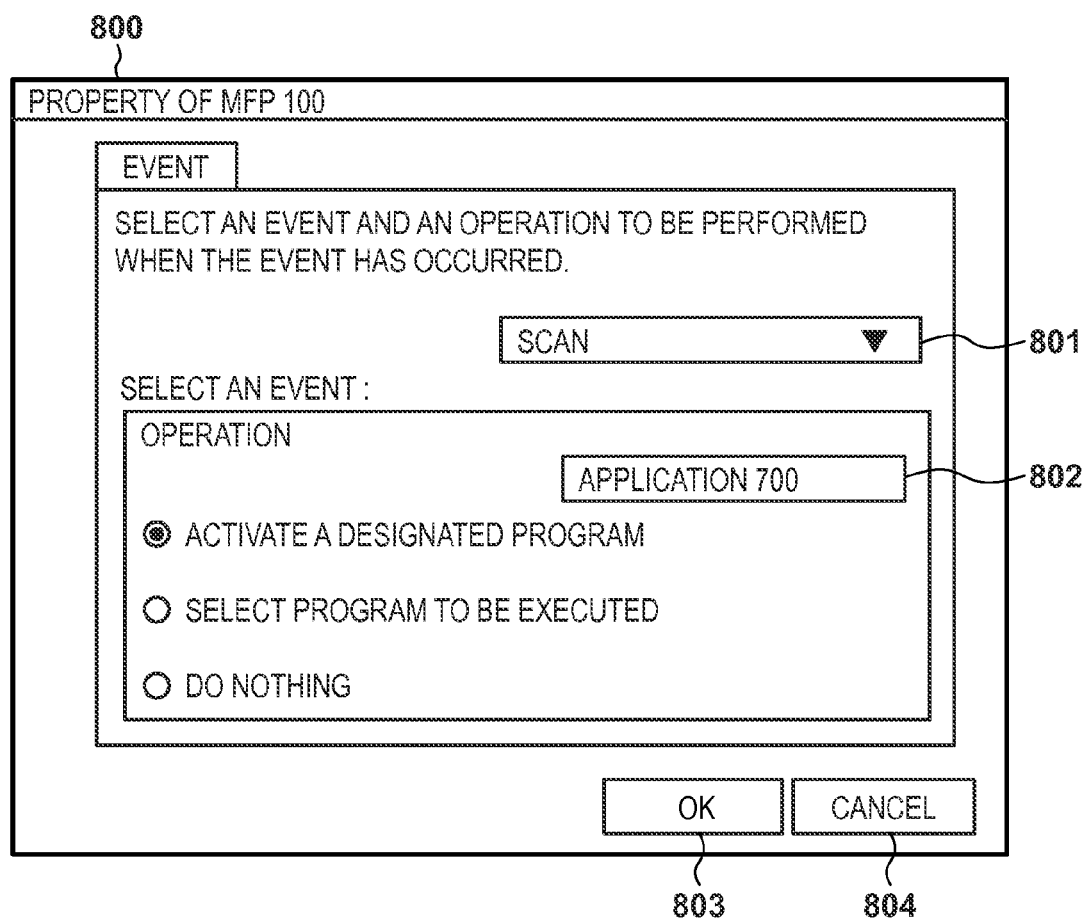
FIG. 8 is a view showing an example of a screen to select an operation of the MFP for a push event.

FIG. 8 is a view showing an example of the display screen of the display to select an operation of the MFP 100 for a push event. This screen is displayed on the display unit 205 of the PC 200.

To allow the PC 200 to use the scan function of the MFP 100 using the WSD protocol, the MFP 100 recognized by the OS as a WSD device connected to the network is selected, and installation is executed. With this procedure, the standard WSD scanner driver of the OS is installed. The standard WSD scanner driver defines five push events to which OS standard events are assigned. However, it is unnecessary to support all of the five push events on the side of the MFP 100.

The state of a push event of the MFP 100 can be confirmed/changed in a property dialogue 800 shown in FIG. 8. This is a dialogue prepared on the OS side. A push event of the MFP 100 can be selected in a pull-down list 801, and an operation can be designated for each event. If "activate a designated program" is selected, an application 700 to be activated can be selected in a pull-down list 802. When an OK button 803 is clicked after a change of an operation for the event, the setting is saved. When a cancel button 804 is clicked, the change is discarded.

Note that the application 700 needs to be installed in the disk unit 202 of the PC 200. The application 700 is an application capable of receiving a push event of WSD, and assigns itself to the push event of the MFP 100. To assign the application 700 to the push event of the MFP 100, settings described in the registry or the like of the PC 200 are changed by the installer of the application 700. To do this, an API prepared on the OS side may be used. Alternatively, the property dialogue 800 may manually be opened to change the settings.

Note that the following conditions are assumed to be met as prerequisites for push scan performed between the MFP 100 and the PC 200 using the WSD protocol. That is, (1) the WSD scanner driver of the MFP 100 and the application 700 have already been installed in the disk unit 202 of the PC 200, and (2) the application 700 has already been assigned to a WSD event of the MFP 100. Also it is assumed that both the MFP 100 and the PC 200 have been powered on to be in a ready state.

Referring back to FIG. 7, after pressing the scan key 404 of the MFP 100, the user designates the PC 200 as the saving destination of a scanned image and presses the color start key 406 or the monochrome start key 407. The MFP 100 detects pressing of the color start key 406 or the monochrome start key 407 based on the user operation (A1). Upon detecting the pressing, the MFP 100 temporarily saves scan settings made by the user (A2) and issues a ScanAvailableEvent command 701 to the PC 200 based on a WSD API.

This command is an OS standard API and can include a UUID, a connection device path of Image Class, and an event GUID.

The connection device path of Image Class can be acquired as, for example,

StiDevice:{6BDD1FC6-810F-11D0-BEC7-08002BE2092F}¥0001, and the UUID of the event can be acquired as, for example, /StiEvent:{C686DCEE-54F2-419E-9A27-2FC7F2E98F9E}.

Hence, the application 700 of the PC 200 can identify the MFP 100 and the type of the issued event based on these pieces of information (B1).

After identifying the MFP 100 and the event type, the application 700 generates scan settings (B2) and issues a CreateScanJobRequest command 702 based on the WSD API. In scan setting generation, scan settings such as a resolution and a color mode saved in the PC 200 in advance are used in the specifications defined by the WSD protocol. In this embodiment, however, the user sets scan in the MFP 100, and the scan settings need not be notified from the MFP 100 to the PC 200. For this reason, the PC 200 may be unable to know the scan settings. Hence, the PC 200 uses default scan set values or neutral scan set values such as a resolution of 0 dpi.

After receiving the CreateScanJobRequest command 702, the MFP 100 acquires the UUID stored in the command. The UUID is the same as that included in the ScanAvailableEvent command 701. Hence, the MFP 100 identifies the received command as the CreateScanJobRequest command 702 corresponding to the push scan event that has occurred in the MFP 100 (A3).

In the specifications defined by the WSD protocol, scan settings are stored in the CreateScanJobRequest command 702. However, in scan setting command (702), default scan set values or neutral scan set values are used. Hence, the scan set values saved in advance in scan setting saving (A2) are used to do scan settings for actual scan. Note that the command of WSD API has the XML format, and the scan settings for actual scan can be obtained by directly rewriting the XML format or by parsing the XML format into another format and replacing the scan settings.

Note that in a case where the CreateScanJobRequest command 702 of a different UUID is received, the event is issued from another PC as pull scan. For this reason, the saved scan settings are not used, and the scan settings included in the CreateScanJobRequest command 702 are used. Alternatively, assuming that push scan has been performed first, the CreateScanJobRequest command 702 issued as push scan is invalidated.

After that, the MFP 100 issues a CreateScanJobResponse command 703 to the PC 200 based on the WSD API. After receiving the CreateScanJobResponse command 703, the PC 200 completes preparation of image transfer and issues a RetrivelImageRequest command 704 to the MFP 100 based on the WSD API (B3).

The MFP 100 receives the RetrivelImageRequest command 704, starts scan based on the made scan settings (A4), and transfers the image (A5). This image transfer is performed by adding the image data to a RetrivelImageResponse command 705.

After receiving the RetrivelImageResponse command 705, the PC 200 obtains and saves the image stored in the RetrivelImageResponse command 705 (B4).

The above description is directed to command exchange performed between the MFP 100 and the PC 200 in accordance with the WSD protocol. Processes executed in the MFP 100 and the PC 200 in accordance with the command exchange will be described below.

Figure 9:
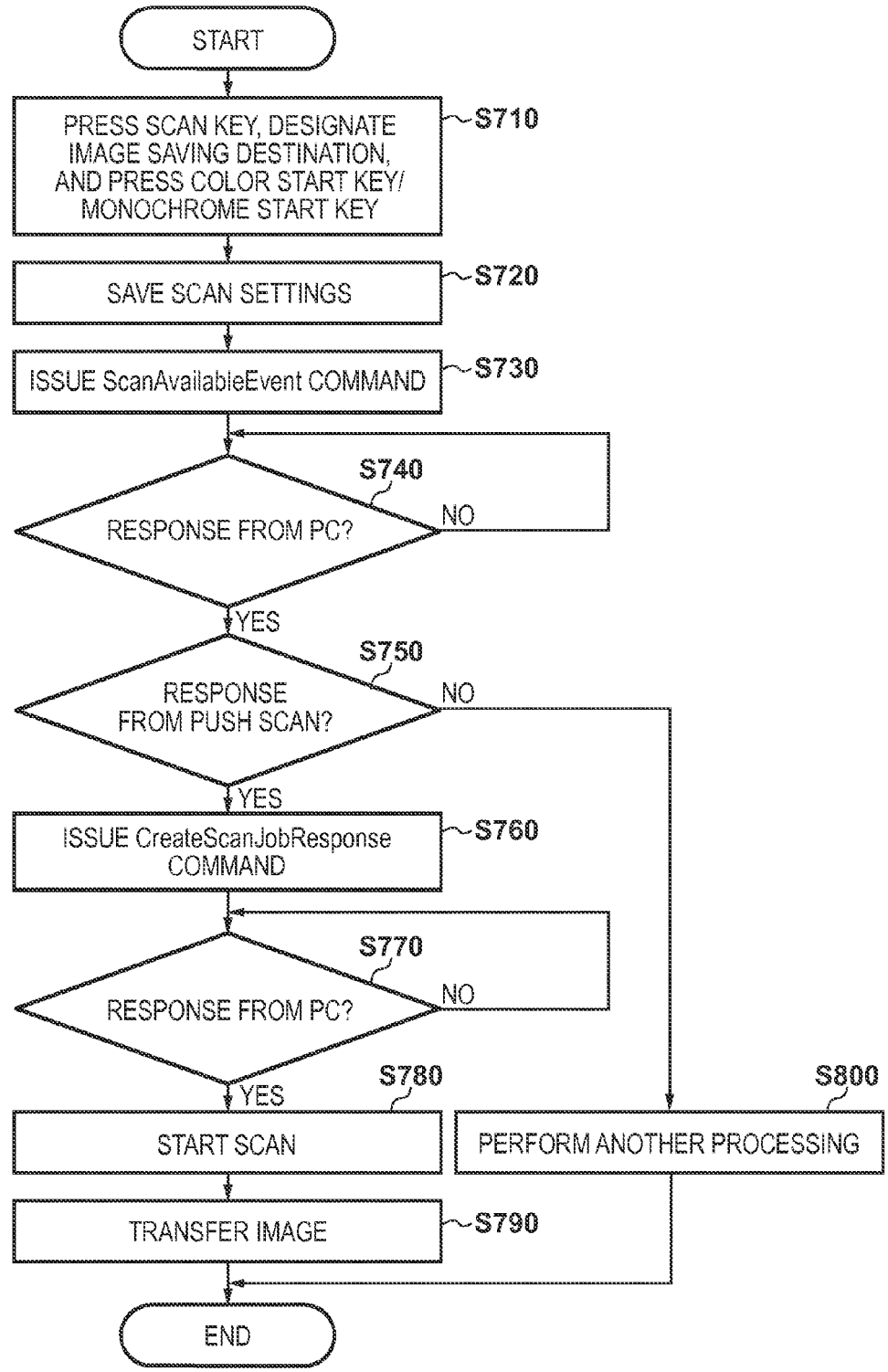
FIG. 9 is a flowchart showing processing on the MFP side.

FIG. 9 is a flowchart showing processing on the side of the MFP. Note that a program corresponding to the flowchart is stored in the program memory 106, and the CPU 105 executes the program on the work memory 107, thereby implementing the processing shown in FIG. 9.

First, after pressing the scan key 404 of the MFP 100, the user designates the PC 200 as the saving destination of a scanned image, and presses the color start key 406 or the monochrome start key 407. In step S710, the MFP 100 detects pressing of the color start key 406 or the monochrome start key 407 based on the user operation.

In step S720, upon detecting the pressing of the key, the MFP 100 temporarily saves scan settings made by the user in the work memory 107. In step S730, the MFP 100 issues the ScanAvailableEvent command 701 to the PC 200 based on the WSD API prior to actual image reading. In step S740, the MFP 100 waits for an instruction from the external apparatus such as the PC 200.

After the MFP 100 receives the command from the external apparatus, the process advances to step S750. In step S750, the MFP 100 checks based on the UUID stored in the command whether or not the received command is the CreateScanJobRequest command 702 corresponding to the push scan event that has occurred in the MFP 100. That is, in step S750, the MFP 100 determines whether or not the command from the external apparatus is a command from the PC 200 and also serves as a response to the ScanAvailableEvent command 701 issued to the PC 200 in step S730. In a case where it is determined that the received command is the CreateScanJobRequest command 702 corresponding to the push scan event that has occurred in the MFP 100, the process advances to step S760. In step S760, the MFP 100 issues the CreateScanJobResponse command 703 to the PC 200 based on the WSD API. The process advances to step S770 to wait for an instruction from the PC 200.

Upon receiving the RetrivelImageRequest command 704 from the PC 200 in step S770, the process advances to step S780. In step S780, the MFP 100 starts scan based on scan settings stored in the work memory 107 in advance in step S720. In step S790, the MFP 100 adds image data generated by reading an image by scan to the RetrivelImageResponse command 705 based on the WSD API, thereby transferring the image to the PC 200.

In a case where it is determined in step S750 that the received command is not the response corresponding to the push scan event that has occurred in the MFP 100, the process advances to step S800 to perform another processing. Then, the series of processes ends. For example, if a pull scan instruction from a PC other than the PC 200 is received, it is determined in step S750 that the received command is not the response to the ScanAvailableEvent command 701 issued to the PC 200.

Another processing here includes processing of invalidating the CreateScanJobRequest command 702 issued as a push scan assuming that push scan has been performed first, as described above, and scan processing corresponding to pull scan from another PC.

Figure 10:
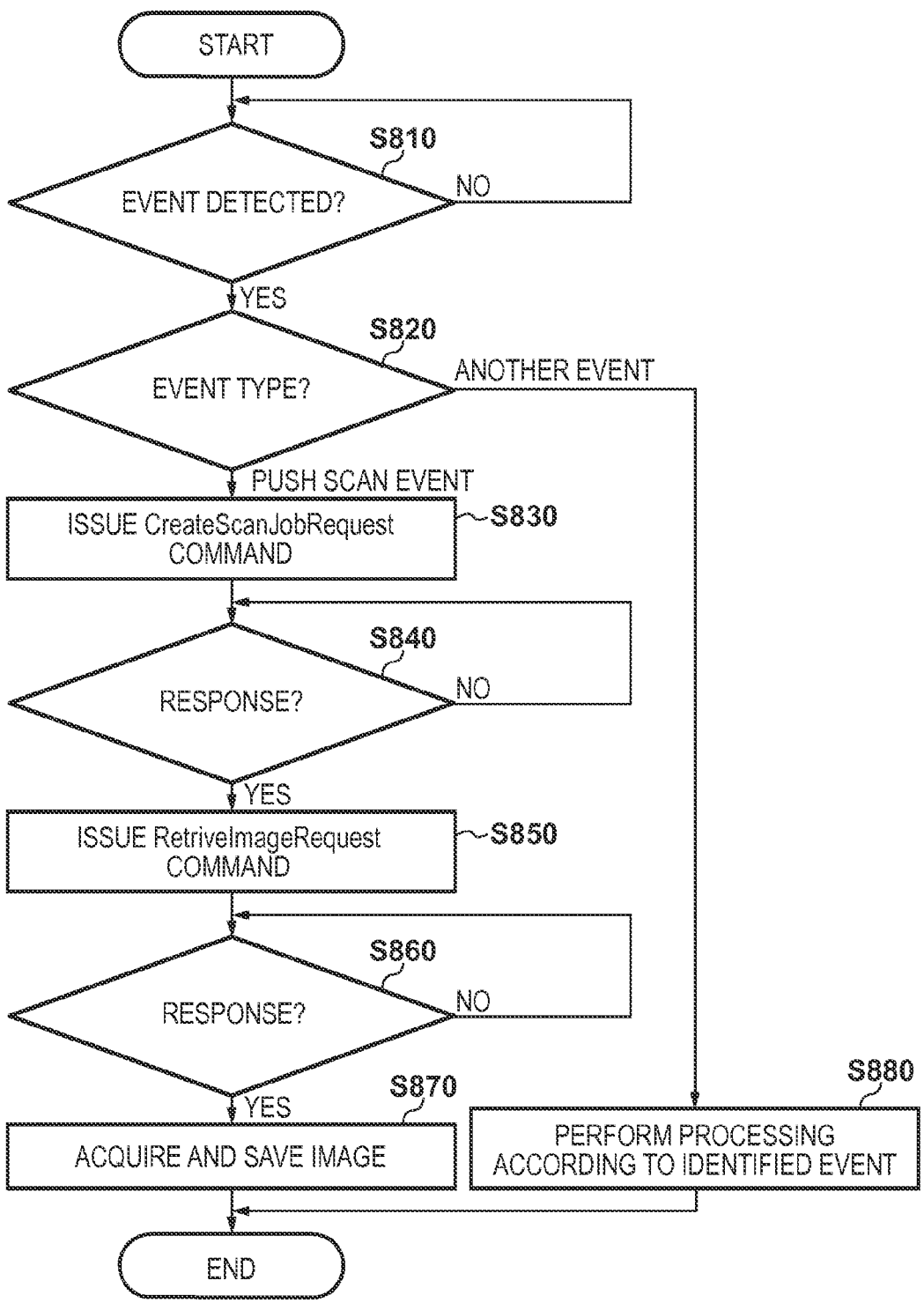
FIG. 10 is a flowchart showing processing on the PC side.

FIG. 10 is a flowchart showing processing on the side of the PC. This particularly explains processing of the application 700 of the PC 200. Note that a program corresponding to the flowchart is stored in the disk unit 202, and the CPU 201 executes the program on the memory 204, thereby implementing the processing shown in FIG. 10.

First, in 810, the PC 200 waits for detection of an event from the MFP 100. Upon detecting an event, the process advances to step S820 to identify the type of the event. If the event is identified as a push scan event from the MFP 100, the process advances to step S830 to generate scan settings and issue the CreateScanJobRequest command 702 based on the WSD API. After that, the process advances to step S840 to wait for a response from the MFP 100.

Upon receiving the CreateScanJobResponse command 703 in step S840, the process advances to step S850 to prepare for image transfer. When the preparation is completed, the PC 200 issues the RetrieveImageRequest command 704 to the MFP 100 based on the WSD API. In step S860, the PC 200 waits for a response to the transmitted command.

Upon receiving the RetrieveImageResponse command 705 as the response in step S860, the process advances to step S870 to acquire and save an image stored in the RetrieveImageResponse command 705.

Note that if an event other than push scan is identified in step S820, the process advances to step S880 to execute processing corresponding to the identified event.

Figure 11:
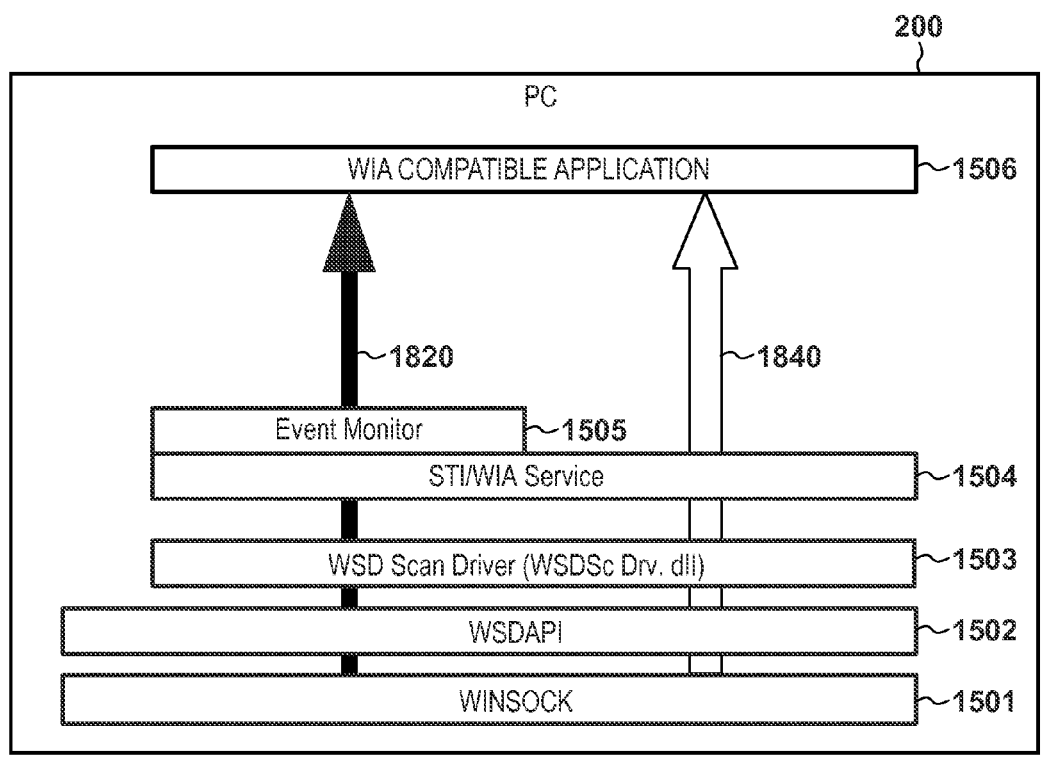
FIG. 11 is a conceptual view of modules in the PC at the time of WSD scan.

FIG. 11 is a view showing the overview of a module stack in the PC upon executing scan using the WSD protocol.

Upon executing scan from the MFP 100, a WIA compatible application 1506 in the PC 200 activates an OS standard WSD Scan Driver (WSDScDrv.dll) 1503 via an STI/WIA Service 1504 of the OS. The WSD Scan Driver 1503 sends a scan request to the MFP 100 via a WINSOCK (Windows Sockets API) 1501 using a WSD API 1502. Scan data 1840 is thus obtained. A push event 1820 from the MFP 100 activates the WIA compatible application 1506 assigned to the event via an Event Monitor 1505 that is a function of the OS.

Hence, according to the above-described embodiment, since scan settings made by the user on the operation unit of the MFP are saved in the MFP in a push scan, scan can be performed based on the saved settings upon receiving a scan instruction from the PC. This makes it possible to implement push scan based on user's desired settings without especially notifying the PC of the scan settings made by the user on the operation unit of the MFP.

Hence, even in a case where, for example, scan settings made on the MFP cannot be notified to the PC, scan can be executed in accordance with desired scan settings made by the user on the MFP. In addition, even in a case where scan settings made on the MFP can be notified to the PC, according to the processing of this embodiment, it is unnecessary to notify the PC of the scan settings. It is therefore possible to reduce the traffic between the PC and the MFP in a series of scan processes. Furthermore, since scan settings can be made before the MFP receives a scan instruction from the PC, the MFP can quickly start scan upon receiving the scan instruction.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-136213, filed Jul. 1, 2014, which is hereby incorporated by reference herein in its entirety.

What is claimed is:

1. An image reading apparatus for optically reading an image, comprising:
   an operation unit configured to cause a user to perform an operation;
   a storage unit configured to store a condition, to execute reading of the image, which is set in accordance with the operation on said operation unit;
   a notification unit configured to notify an information processing apparatus, which is a transfer destination of image data obtained by performing the reading, of an event of image reading in accordance with an instruction of the image reading on said operation unit;
   a reception unit configured to receive a command from an external apparatus;
   a determining unit configured to determine whether the command received by said reception unit is an instruction responding to the event notification by said notification unit from the information processing apparatus; and
   a control unit configured to control, in a case where said determining unit determines that the command is the instruction from the information processing apparatus, to start the image reading based on the condition stored in said storage unit in advance before the instruction from the information processing apparatus, regardless of a reading condition set in the command.

2. The apparatus according to claim 1, further comprising a transfer unit configured to transfer the image data to the information processing apparatus.

3. The apparatus according to claim 1, wherein communication with the information processing apparatus is performed in accordance with a predetermined protocol.

4. The apparatus according to claim 3, wherein the protocol includes a WSD protocol.

5. The apparatus according to claim 1, wherein the event includes a push scan event.

6. The apparatus according to claim 1, wherein said operation unit comprises:
a keyboard configured to cause the user to make a setting; and
a display configured to display contents of the setting.

7. The apparatus according to claim 1, wherein the condition includes at least one of an original type, a reading size, a resolution, an original orientation, and a saving format.

8. The apparatus according to claim 1, wherein the image reading apparatus is integrated in a multifunction printer comprising an image formation unit.

9. A method of controlling an image reading apparatus for optically reading an image, comprising:
storing, in a memory, a condition to execute reading of the image, which is set in accordance with an operation on an operation unit configured to cause a user to perform an operation;
notifying an information processing apparatus, which is a transfer destination of image data obtained by performing the reading, of an event of image reading in accordance with an instruction of the image reading on the operation unit;
receiving a command from an external apparatus;
determining whether the received command is an instruction responding to the notified event from the information processing apparatus; and
controlling, in a case where it is determined that the command is the instruction from the information processing apparatus, to start the image reading based on the condition stored in the memory in advance before the instruction from the information processing apparatus, regardless of a reading condition set in the command.

10. The method according to claim 9, further comprising transferring the image data to the information processing apparatus.

11. The method according to claim 9, wherein communication with the information processing apparatus is performed in accordance with a predetermined protocol.

12. The method according to claim 11, wherein the protocol includes a WSD protocol.

13. The method according to claim 9, wherein the event includes a push scan event.

14. The method according to claim 9, wherein the condition includes at least one of an original type, a reading size, a resolution, an original orientation, and a saving format.

15. The method according to claim 9, wherein the image reading apparatus is integrated in a multifunction printer comprising an image formation unit.

16. A non-transitory computer readable storage medium which stores a computer program to be executed in a processor of an image reading apparatus, the program comprising:
storing, in a memory, a condition to execute reading of the image, which is set in accordance with an operation on an operation unit configured to cause a user to perform an operation;
notifying an information processing apparatus, which is a transfer destination of image data obtained by performing the reading, of an event of image reading in accordance with an instruction of the image reading on the operation unit;
receiving a command from an external apparatus;
determining whether the received command is an instruction responding to the notified event from the information processing apparatus; and
controlling, in a case where it is determined that the command is the instruction from the information processing apparatus, to start the image reading based on the condition stored in the memory in advance before the instruction from the information processing apparatus, regardless of a reading condition set in the command.

17. The apparatus according to claim 1, wherein in a case where said determining unit determines that the command is not the instruction from the information processing apparatus, said control unit controls to start the image reading based on a condition set in the command.

18. The apparatus according to claim 1, wherein the image reading apparatus does not notify the information processing unit of the condition stored in said storage unit.

19. The apparatus according to claim 1, wherein in a case where said determining unit determines that the command is the instruction from the information processing apparatus and the reading condition is set in the command, said control unit controls to start the image reading based on the condition stored in said storage unit in advance before the instruction from the information processing apparatus without using the condition set in the command.

20. The apparatus according to claim 1, wherein said determining unit executes the determination, depending on whether or not a first ID included in the command received by the reception unit is the same as a second ID included in notification information of the event notified by said notification information.

* * * * *